United States Patent [19]

Froening et al.

[11] Patent Number: 4,637,175

[45] Date of Patent: Jan. 20, 1987

[54] CONSTRUCTION FOR FASTENING PARTS TO A CONCRETE WALL

[75] Inventors: Helmut Froening; Mohamed Basyouni, both of Mannheim, Fed. Rep. of Germany

[73] Assignee: Hochtemperatur-Reaktorbau GmbH, Cologne, Fed. Rep. of Germany

[21] Appl. No.: 509,600

[22] Filed: Jun. 30, 1983

[30] Foreign Application Priority Data

Jul. 3, 1982 [DE] Fed. Rep. of Germany ....... 3224986

[51] Int. Cl.$^4$ .............................. F16L 3/22; E04B 1/38
[52] U.S. Cl. ............................................ 52/27; 52/39; 52/698; 248/68.1; 248/59
[58] Field of Search ................ 248/59, 58, 62, 68.1; 52/27, 39, 601, 704, 484, 698

[56] References Cited

U.S. PATENT DOCUMENTS

| | | | |
|---|---|---|---|
| 1,072,361 | 9/1913 | Rickman | 248/58 |
| 1,314,724 | 9/1919 | Winchester | 248/59 |
| 1,596,317 | 8/1926 | Skinner | 248/59 |
| 1,605,996 | 11/1926 | Stewart | 248/59 |
| 1,752,671 | 4/1930 | Knight | 52/601 |
| 2,156,639 | 5/1939 | Powell | 248/59 |
| 2,375,513 | 5/1945 | Bach | 248/59 |
| 2,524,916 | 10/1950 | Loos | 248/58 |
| 2,801,064 | 7/1957 | Callahan | 248/68.1 |
| 2,953,874 | 9/1960 | Kindorf | 248/58 |
| 3,228,161 | 1/1966 | McCown | 52/601 |
| 3,387,809 | 6/1968 | Zwerling | 248/58 |
| 3,493,206 | 2/1970 | Albro | 248/59 |
| 3,866,871 | 2/1975 | Dupuy, Sr. | 248/68.1 |
| 4,078,752 | 3/1978 | Kindorf | 248/62 |
| 4,483,121 | 11/1984 | Froening et al. | 52/698 |

Primary Examiner—Carl D. Friedman
Assistant Examiner—Michael Safavi
Attorney, Agent, or Firm—Robert J. Koch

[57] ABSTRACT

An arrangement for mounting pipes and the like to a concrete wall or slab comprises a fastening device constructed in the manner of building blocks and consisting of prefabricated parts. A specially designed concrete anchor is inserted prior to pouring the concrete in a reinforcing matrix of a concrete slab or wall. It is possible thereby to keep the distance tolerances between the concrete anchors very small and to standardize all of the parts of the fastening construction, which particularly includes supporting rods, beams and diagonal rods.

24 Claims, 6 Drawing Figures

CONSTRUCTION FOR FASTENING PARTS TO A CONCRETE WALL

BACKGROUND OF THE INVENTION

1. Field of the Invention

The invention concerns a construction for fastening parts to a concrete wall or slab and more particularly for an arrangement of anchors in a concrete wall or slab and a plurality of rods connected thereto.

2. Background of the Prior Art

In order to fasten parts of an assembly, for example pipes at a certain distance from a concrete wall or slab to said wall or slab, appropriate fastening parts are needed. A special problem is posed in this respect by the anchoring of the fastening elements in concrete itself. Anchoring with the aid of dowels is difficult in the case of steel reinforced concrete structural parts, due to the danger inherent with drilling into the reinforcement. A high expenditure of labor is required to safely avoid such damage.

In conventional operations the casting of anchors in the concrete at locations where they are subsequently needed requires very early planning. In spite of all the care taken, this does not always produce satisfactory results. The concrete anchors are often needed at a location other than that initially planned. Such difficulties have been eliminated in the prior art by means of a grid like distribution of numerous concrete anchors over a large surface.

The grid like distribution of concrete anchors as a function of the static load on a building wall is described in West German Offenlegungsschrift No. 29 11 157. It is further known that concrete anchors can be installed in the reinforcement prior to the pouring of the concrete wall. This is described in British Patent Specification No. 10 80 793. Even though it is also known to fasten pipes with the aid of rod linkages anchored in the concrete wall, this arrangement does not utilize the standardizing effect of a predetermined grid. Without such a standardization, it is necessary to adapt the fastening elements in each individual case. This in general requires the high cost of intensive welding and cutting work at the site of installation.

SUMMARY OF THE INVENTION

It is therefore an object of the invention to provide an apparatus for fastening parts to a concrete wall or slab comprising prefabricated fastening elements correlated with each other in the manner of building blocks. In particular, an object of the invention is to assure a precise distance of the individual fastening elements to each other and at the same time be of simple construction while permitting the east mounting of parts onto the elements.

These and other objects of the invention are attained according to the invention as set forth below.

The present invention concerns a construction for fastening parts to a concrete wall or slab comprising a grid member embedded in a concrete wall and having uniformly shaped grid units, a plurality of anchors attached to the grid embedded in the concrete wall at uniformly spaced distances from one another, a support structure extending from the anchors, and a plurality of beams releasably attached at one end to the support structure and being suitable for attachment to the parts to be mounted on the concrete wall.

As the concrete anchors are installed in a welded reinforcing grid, the distances may be maintained with high accuracy. A precondition of the fastening of rod structures with standardized, building block like parts to the concrete anchors is the highly accurately spaced added reinforcing grid. In the case of particularly heavy loads, standardized anchoring plates may also be used, thereby distributing the load over several concrete anchors.

The standardization of the fastening elements is facilitated by inserting the concrete anchors in a specific grid arrangement with respect to each other in a reinforcing matrix. In this manner the concrete anchors are located on a common straight line at the same distance from each other.

In order to make the simple attachment of the concrete anchors to the reinforcing matrix possible, the anchors have an annular groove, which is engaged by four rods forming one mesh unit of the reinforcing matrix. The annular groove is enclosed by two flanges designed so that the concrete anchor fits through a mesh of the reinforcing matrix. Since the annular groove has rises deviating from the circular, the concrete anchor can be easily clamped tightly between the matrix rods by a slight rotation of said anchor.

The concrete anchor arrangement may be laid out so that it is provided additionally with anchoring elements on both sides of the concrete wall or slab, connected with each other by means of a threaded rod. This makes it possible to use the anchor on either or both sides. If used on one side only, an anchoring plate embedded in the concrete is arranged on the end opposite the attachment side. A tilting of the anchoring orifice of the concrete anchor with respect to the external surface of the concrete anchor may be compensated for by equipping the concrete anchor with a connecting nut, supported in a laterally pivoting manner.

It is of significant advantage for the rapid mounting of the fastening elements to provide the supporting rods with a threading with a coarse thread. The fastening pieces are screwed onto the supporting rods; they serve to hold the diagonal rods. Diagonal rods are used only when an enhanced rigidization of the rod structure is required, for example if the construction is to be earthquake safe.

The fastening pieces serving to connect the diagonal rods with the supporting rods consist of connecting part to be screwed onto the supporting rod and an articulated joint, movably located in said connecting part, into which the diagonal rod is screwed. The threading of the diagonal rod is again coarse to facilitate rapid mounting.

Rapid mounting is decisively advanced by a combination of coarse and standard threads. Thus, the screwing of diagonal rods and supporting rods to regulate the height of the rod structure is effected by means of coarse threads, while the rod structure is fastened in the position desired by means of nuts screwed onto a standard threading.

BRIEF DESCRIPTION OF THE DRAWINGS

Several embodiments of the invention are shown in the drawings and are described hereinafter in more detail.

In the drawings the following features of the invention are illustrated:

FIG. 6 shows a variation of FIG. 1 with anchoring plates.

DETAILED DESCRIPTION OF THE PREFERRED EMBODIMENTS

Figure 1:
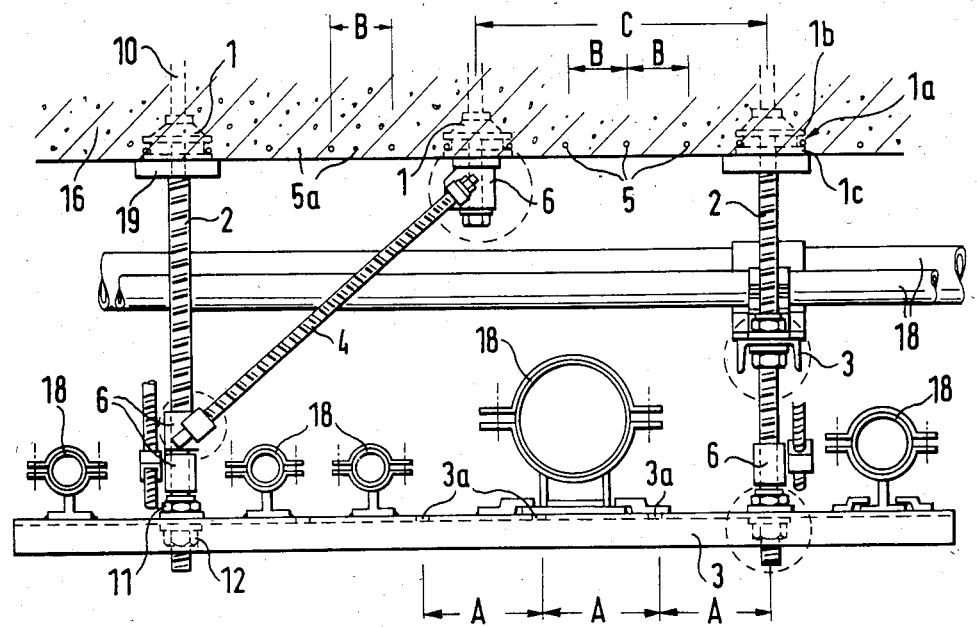
FIG. 1 shows the fastening apparatus of the invention in a concrete slab and comprising concrete anchors, supporting rods, diagonal rods and beams.
Figure 2:
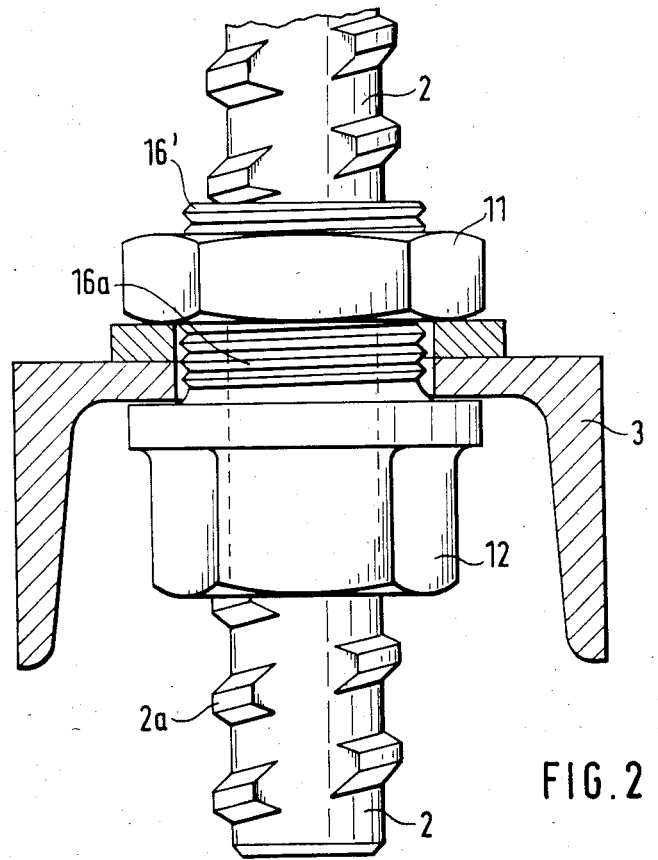
FIG. 2 shows a detail of the connecting location of a supporting rod with a beam.

The fastening apparatus shown in FIG. 1 and anchored in a concrete slab 16 comprises a basic configuration of concrete anchors 1, supporting rods 2 and beams 3. The concrete anchors 1 are inserted prior to the pouring of the concrete slab 16 in the meshes 5a of a reinforcing matrix 5. Due to the special configuration of the concrete anchor 1 and its alignment into a square mesh 5a, a given distance between the concrete anchors is maintained with a high accuracy. The mesh 5a of the reinforcing matrix 5 provides a given grid dimension, which makes it possible to distribute the concrete anchors 1 with a uniform lattice constant over a large surface. The grid distance C between the concrete anchors 1 is a multiple of the grid dimension B given by the reinforcing matrix 5. The beams 3 are connected by means of the connecting holes 3a with the supporting rods 2 and are also dependent on the grid dimension B. Thus, the distance A of the connecting holes 3a is equal to or a multiple of the grid dimension B. As shown in FIG. 2, a standardized beam consisting of a U section or a standard anchoring plate may be used as the beam 3. An anchoring plate, not shown in the drawing, is used preferably when a large load must be distributed over several concrete anchors.

The supporting rods 2 are screwed unilaterally into the concrete anchor 1 and joined on their other side with a beam 3. The distance of the beam 3 to the concrete slab 16 is determined by an adjusting nut 12, located on the coarse threads 2a of the supporting rod 2 and capable of rapid changes in position. A lock nut 11 serves to immobolize the beam by being screwed onto a pipe fitting 16' equipped with standard threads 16a of the adjusting nut 12.

The basic configuration described hereinabove is generally adequate for pipe lines in industrial construction. If, however, the structure is to be resistant to earthquakes or when it is planned to transmit large horizontal forces with a slight horizontal displacement, then generally the diagonal rods 4, as shown in FIG. 1, are required. The latter are also equipped with a rolled, coarse threading 4a and fastened with the special fastening pieces 6 to the supporting rods 2. The diagonal rods 4 may be installed after the assembly of the pipe line.

Figure 3:
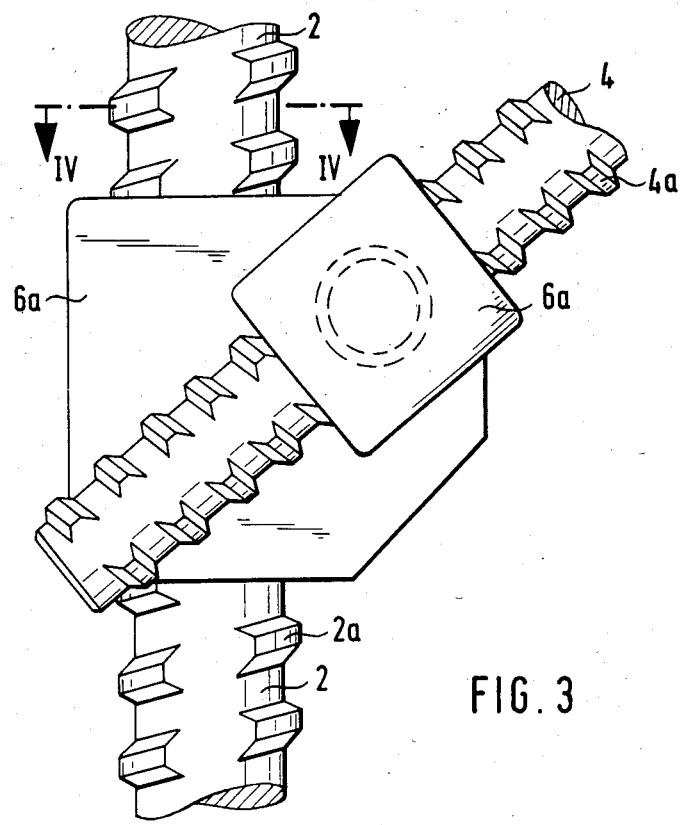
FIG. 3 illustrates the fastening piece connecting a supporting rod and a diagonal rod, in a lateral elevation.
Figure 4:
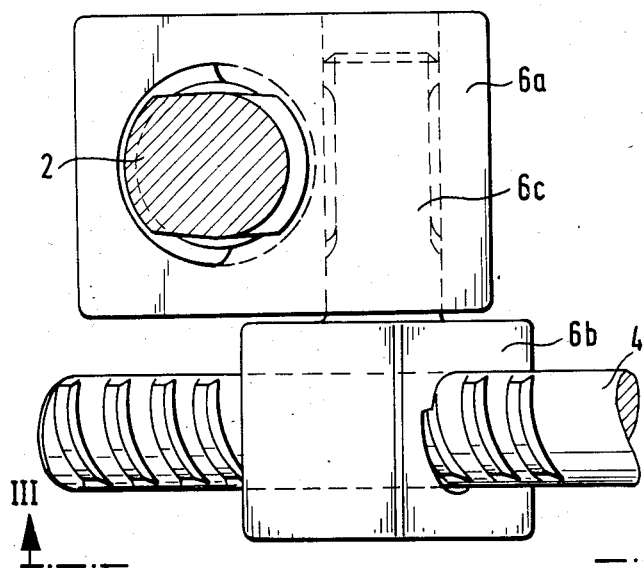
FIG. 4 is a top view of the fastening apparatus of the invention.

As shown in FIG. 3, the fastening piece 6 comprises a connecting part 6a to be screwed onto the supporting rod 2 and an articulated part 6b located rotatingly therein for the fastening of the diagonal rod 4. A journal 6c, as shown in FIG. 4, serves to rotatingly anchor the articulated part 6b in the connecting part 6a. To mount the diagonal rod 4, it is initially screwed on one side into an articulated part 6b equipped with internal threading to an appropriate depth and then on the other side inserted back into an articulated part 6d, as shown in FIG. 5, without internal threading and then fastened by means of a counter nut 17 and a washer 15 on the standard threading provided at the end of the diagonal rod 4.

In order to properly fit together the parts of the fastening device prefabricated in the manner of building blocks, the anchoring orifice of the concrete anchor 1 may be slightly tilted with respect to the external surface of the concrete wall 16. Excessive tilting would result in the inability of a given length of the supporting rods 2 to fit into the holes 3a of the beam 3.

Figure 5:
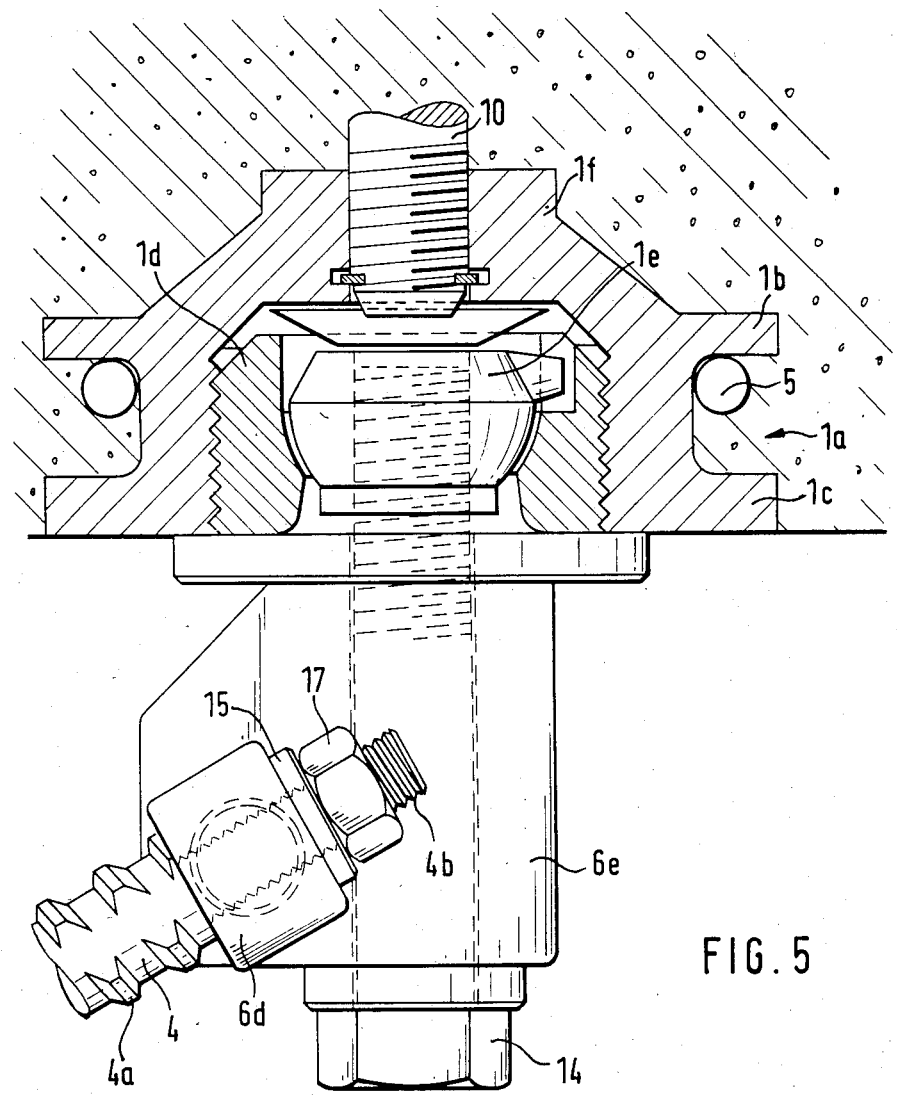
FIG. 5 illustrates the fastening apparatus of the invention with the supporting rods screwed directly into the concrete anchor and attaching a diagonal rod.

As shown in FIG. 5, the concrete anchor 1 is equipped with a rotatingly supporting connecting nut 1e. The bearing shell for the connecting nut 1e comprises a threaded piece 1d, that is screwed into a clamping part 1f after the insertion of the threaded nut. The movably supported connecting nut 1e makes it possible to equalize tilts and to mount the supporting rod 2 with the aid of the washer 19 (FIG. 1) perpendicularly to the concrete slab 16.

The clamping part 1f is fastened by means of an annular groove 1a to the grid rods 5 of a reinforcing matrix. The annular groove 1a is formed by two flanges 1b, 1c, the external surface of which is parallel to the concrete wall and is slightly smaller in its square dimensions than one mesh of the reinforcing matrix. In FIG. 5, the clamping part 1f is shown in section, with the section effected diagonally to its square external surface.

FIG. 5 also shows a double anchor equipped on both sides of a concrete wall with anchoring elements connected by a threaded rod extending through the wall. FIG. 6 shows a unilateral anchor with an anchoring plate 20 located on one side of the concrete wall, and an anchoring plate 21 fastened to several of the anchors for support of large loads.

The construction as illustrated is most advantageously used for mounting internal structural members in nuclear reactors, especially reactors having concrete pressure vessels and even vessels with steel liners adjacent to the concrete walls. Examples of such nuclear reactors are well known. One such reactor is described in U.S. Pat. No. 4,175,001, the full disclosure of which is incorporated herein.

The above description describes a preferred embodiment of the invention. It is to be understood, however, that the invention is not limited to any single embodiment or feature, but should be construed to cover all modifications and alternative embodiments falling within the scope of the invention as defined by the claims which follow.

What is claimed is:

1. A construction for fastening parts to a concrete wall comprising:
    a grid matrix embedded in said concrete wall and having uniformly shaped grid units,
    a plurality of anchors attached to said embedded grid in said concrete wall at uniformly spaced distances to one another,
    a plurality of supporting rods, each supporting rod extending from one of said anchors, and
    a plurality of beams releasably attached to at least one supporting rod and being suitable for attachment of parts thereto, wherein said anchors are provided with an annular groove, which is engaged by four grid rods forming a grid unit of the grid matrix.

2. The construction of claim 1, wherein said beam displays a plurality of connecting holes for attachment of parts.

3. The construction of claim 1, wherein one area of said beams is threaded for attachment of said parts with bolts.

4. The construction of claim 1, wherein the concrete wall is a nuclear reactor concrete wall.

5. The construction of claim 1, wherein the concrete wall is a nuclear reactor concrete slab.

6. The construction of claim 1, wherein said grid matrix is a welded reinforcing matrix.

7. The construction of claim 2, wherein the distances between said plurality of connecting holes and between said plurality of beams are equal to or multiples of the size of said grid units.

8. The construction of claim 7, wherein the lengths of said supporting rods and said beams and the distance between said connecting holes are standardized in relation to each other.

9. The construction of claim 1, wherein said annular groove has a shape defined by a circumference and is formed by two flanges which enable said concrete anchor to fit through a grid unit of the grid matrix and wherein the shape of the circumference of the annular groove is not completely round and is configured such that upon the rotation of the said anchors the rods forming the grid unit tightly clamp said anchors.

10. The construction of claim 1, wherein said anchors comprise a threaded insert, in which a connecting nut is supported in a laterally pivoting manner.

11. The construction of claim 1, wherein said supporting rods are equipped with coarse threading.

12. The construction of claim 1, further comprising a plurality of fastening pieces screwed onto said supporting rods for connecting two supporting rods.

13. The construction of claim 12, wherein each of said fastening pieces comprises a connecting part threaded for connection with a first supporting rod and an articulated part rotatingly supported in said connecting part for connecting with a second supporting rod at an acute angle to said first supporting rod.

14. The construction of claim 13, wherein said second supporting rod is equipped with coarse threading.

15. The construction of claim 14, wherein said articulated part with an internal threading and an articulated part without an internal threading are provided and said second supporting rod has a standard threading at one end for attachment with a counter nut.

16. The construction of claim 1, wherein one of said anchors is in the form of a unilateral anchor with an anchoring plate located on one side of the concrete wall.

17. The construction of claim 1, wherein an anchoring plate is fastened to several of said anchors for support of large loads.

18. The construction of claim 1, wherein the length of said supporting rods is provided with a coarse threading and said beams exhibit connecting holes for receiving said supporting rods, the distances between said connecting holes correspond to a multiple of the size of said grid units and are standardized in relation to each other.

19. The construction of claim 18, wherein said beams are fastened to said supporting rods by means of adjusting nuts sliding over the coarse threading of said supporting rod and passing through said connecting holes of said beams and secured by a lock nut screwed onto a pipe fitting part of said adjusting nut having an external standard threading.

20. The construction of claim 1, wherein several of said anchors are inserted in a definite grid pattern located the same distance from each other on a common straight line.

21. A construction for fastening parts to a concrete wall comprising:
a grid matrix embedded in said concrete wall and having uniformly shaped grid units,
a plurality of anchors attached to said embedded grid in said concrete wall at uniformly spaced distances to one another,
a plurality of supporting rods, each supporting rod extending from one of said anchors, and
a plurality of beams releasably attached to at least one supporting rod and being suitable for attachment of parts thereto;
wherein one of said anchors is in the form of a double anchor, equipped on both sides of the concrete wall with anchoring elements connected by means of a threaded rod extending through said wall.

22. The construction of claim 21, wherein several of said anchors are inserted in a definite grid pattern with respect to each other in said grid matrix so that said anchors located on a common straight line are at the same distance from each other.

23. The construction of claim 21, wherein one of said anchors is in the form of a unilateral anchor with an anchoring plate located on one side of the concrete wall.

24. The construction of claim 21, further comprising an anchoring plate fastened to several of said anchors for support of large loads.

* * * * *